US006711340B2

(12) United States Patent
Dickson

(10) Patent No.: US 6,711,340 B2
(45) Date of Patent: Mar. 23, 2004

(54) METHOD AND APPARATUS FOR OPTICAL BEAM POWER ATTENUATION

(75) Inventor: William C. Dickson, Granville, OH (US)

(73) Assignee: Glimmerglass Networks, Inc., Hayward, CA (US)

( * ) Notice: Subject to any disclaimer, the term of this patent is extended or adjusted under 35 U.S.C. 154(b) by 200 days.

(21) Appl. No.: 09/935,429

(22) Filed: Aug. 20, 2001

(65) Prior Publication Data

US 2004/0013348 A1 Jan. 22, 2004

(51) Int. Cl.[7] .............................. G02B 6/26; G02B 6/35
(52) U.S. Cl. ......................................... 385/140; 385/18
(58) Field of Search ........... 385/140, 18; 359/196–199, 359/212–214, 223

(56) References Cited

U.S. PATENT DOCUMENTS 5,915,063 A 6/1999 Colbourne et al.
6,137,941 A 10/2000 Robinson
6,222,954 B1 4/2001 Riza
6,263,123 B1 7/2001 Bishop et al.
2002/0168131 A1 * 11/2002 Walter et al. ................ 385/16

* cited by examiner

Primary Examiner—Brian Healy
Assistant Examiner—Mike Stahl
(74) Attorney, Agent, or Firm—Townsend and Townsend and Crew LLP; Kenneth R. Allen

(57) ABSTRACT

Methods and apparatus are provided for the closed loop attenuation of optical beam power in a multiple-axis free-space-coupled single-mode fiber-optic transmission system. In a specific embodiment involving two tip-tilt mirrors to couple optical power from an input fiber to an output fiber, the four mirror axes are actuated in such a way as to produce either a static or time-varying set of induced mirror angles that yield a desired time history of optical loss. The attenuation technique uses the DC level of the measured output power to adjust the amplitude of the induced mirror angles.

25 Claims, 4 Drawing Sheets

METHOD AND APPARATUS FOR OPTICAL BEAM POWER ATTENUATION

BACKGROUND OF THE INVENTION

The invention relates to variable optical attenuators, and in particular to optical switches providing an attenuation capability. The invention finds application to microelectromechanical systems (MEMS), but it is not so limited.

The all-optical optical switch promises to become a key element of fiber-optic networks. Steering elements in the optical switch are used to direct beams of light from input fibers to the desired output fibers. The amount of optical power coupled through a given connection is a function of a) the amount of power present in the input fiber, b) insertion losses at the fibers, lenses, and mirrors, c) coupling loss due to mode radii mismatches and longitudinal errors, and d) coupling loss due to errors in beam alignment as effected by the steering elements.

Previous optical switches have not capitalized on the loss due to errors in beam alignment as a means of intentionally attenuating the power emerging from the output fibers en route to certain other elements of the network. One example of the need for and use of intentional power attenuation is the case of long-haul networks using Dense Wavelength Division Multiplexing (DWDM). An array of Variable Optical Attenuator (VOA) elements immediately upstream of a DWDM system attenuates the power in the incoming fibers to a uniform level as required by the DWDM. In a network employing optical switches in conjunction with power-level-sensitive elements such as DWDM systems, the attenuation function currently executed using dedicated VOA elements could potentially be absorbed by the optical switch, thereby minimizing or eliminating the need for expensive post-switch attenuators.

Variable attenuators are known that use intentional errors in free-space beam alignments as a means of attenuating fiber power. Two such attenuators are described in U.S. Pat. No. 5,915,063 and U.S. Pat. No. 6,137,941, assigned to Lucent Technologies. In these attenuators, a single mirror actuated with at least one actuator is used as a beam-steering element. Optical loss is governed by deflecting the mirror in at least one axis away from a set of angles that maximize coupling. Although this power-loss mechanism is similar to the loss mechanism employed in the present patent, the art of these patents is not applicable to the general case of using two or more steering elements, or to the specific case of an in-operation optical switch utilizing prescribed motions of the steering elements that prohibit the methods of the previous patents.

What is needed is a technique for optical attenuation that can be effected using the steering elements of an in-operation optical switch without deleterious impact on the switching functions.

SUMMARY OF THE INVENTION

According to the invention, a method and apparatus are provided for the closed loop attenuation of optical beam power in a multiple-axis free-space-coupled single-mode fiber-optic transmission system, such as an optical switch. In a specific embodiment, the beans steering elements are two tip-tilt mirrors operative to couple optical power from an input fiber to an output fiber. The plurality of steering elements control both angle and translation of the optical beam at the output relative to a nominal optical axis. The four mirror axes are actuated in such a way as to produce either a static or time-varying set of induced mirror ankles that yield a desired time history of optical loss. The attenuation technique uses the DC level of the measured output power to adjust the amplitude of the induced mirror angles.

Since the attenuation technique is concerned with the DC level of measured power, the technique can be used simultaneously with compatible alignment-detection techniques that ignore the DC component and infer optical alignment through observation of signals at the frequencies of induced motions (dithers). A suitable alignment detection technique is described in a patent application Ser. No. 09/935,429 in the name of the present inventor entitled METHOD AND APPARATUS FOR OPTICAL BEAM ALIGNMENT DETECTION AND CONTROL.

The theoretical basis as presented here for four-axis variable attenuation is sufficient for the general case. Therefore, the disclosure is to be understood to address tile cases for applications of more or fewer than four axes with a plurality of steering elements in the optical path.

The invention will be better understood by reference to the following detailed description in connection with the accompanying embodiments.

DESCRIPTION OF SPECIFIC EMBODIMENTS

Free-space Coupled Fiber Optic Switch Using MEMS

Figure 1:
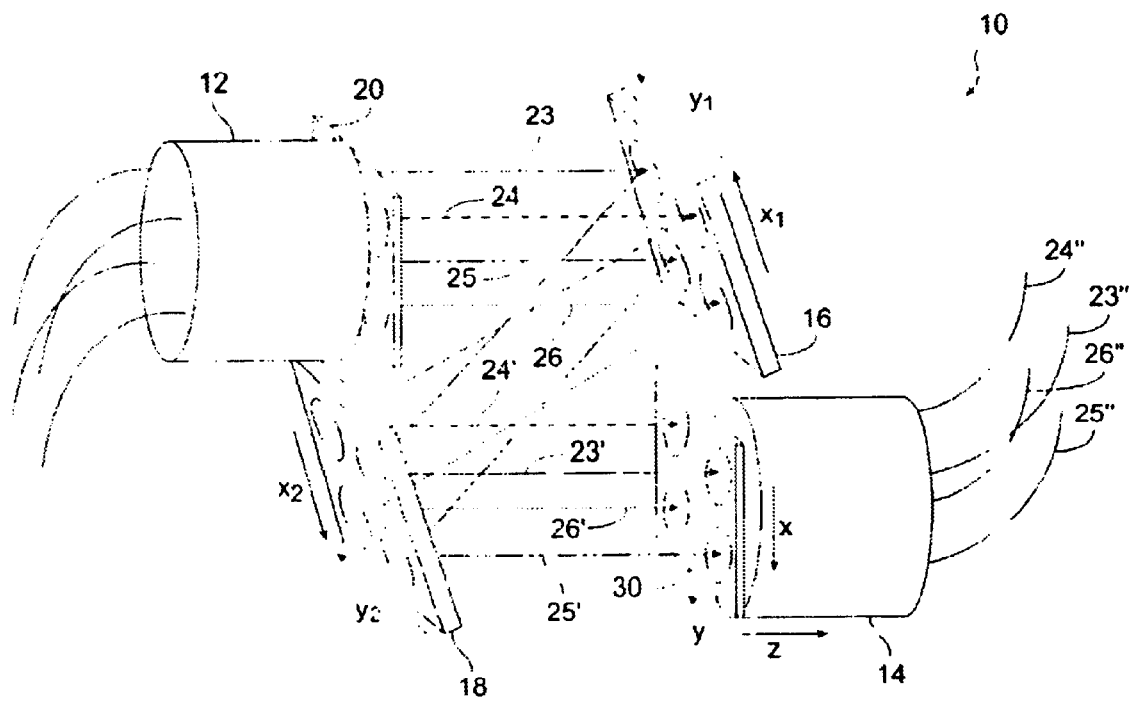
FIG. 1 is a block diagram of a four-port MEMS mirror array fiber optic switch in which the present invention may be implemented.

Referring to FIG. 1 there is shown an example of a four-port MEMS mirror array fiber-optic switch 10 in which the present invention may be implemented. The function of the fiber-optic switch 10 is to produce desired free-space couplings between the input fibers (in a first fiber array 12) and output fibers (in a second fiber array 14) via two-axis steering mirrors on a first mirror array 16 and a second mirror array 18. In the embodiment illustrating the inventions the optical path is unidirectional between input fibers and output fibers, although the invention is not so limited. Expanding laser beams emanating from the input fiber array 12 are substantially collimated using a first lens array 20 confronting the first fiber array 12. Mirrors on the first or input mirror array 16 steer the collimated beams 23–26 from the first lens array 20 toward the appropriate mirrors on the second or output mirror array 18. File mirrors on the output mirror array 18 steer their incident beams 23'–26' into the corresponding lenses on a second or output lens array 30. The output lenses of the second lens array 30 produce converging beams necessary for coupling power into the output fibers 23"–26" of the second fiber array 14.

Output Beam Alignment Geometry

Figure 2:
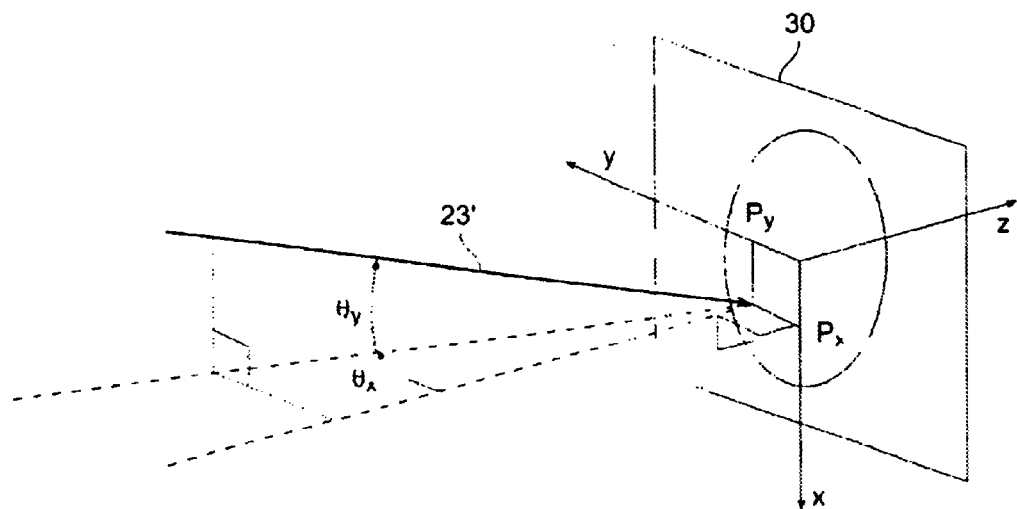
FIG. 2 is a diagram to illustrate beam alignment errors at the output lens as used in the present invention.

Referring to FIG. 2, there is shown a diagram defining the alignment of an output beam relative to its output lens/fiber port in accordance with the invention. This technique may be applied in a variety of geometries, only one of which is that of FIG. 1. The axes "x", "y", and "z" define an "output"

frame. The axis z is defined as the optical axis of the particular lens/fiber port (which may vary across the array of lens/fiber ports), and the perpendicular axes x and y are in the plane perpendicular to z. The beam intersects the output x-y plane at tile linear displacements $P_x$ and $P_y$ in x and y, respectively. The two angles $\theta_x$ and $\theta_y$ define the orientation of the beam in the output x-y-z frame. With $\theta_x$ and $\theta_y$ equal to zero, the beam is parallel to the z axis, $\theta_x$ and $\theta_y$ are the rotations of the beam in the x and y directions, respectively, where a small-angle approximation (valid for the purpose of analyzing optical coupling) eliminates the need to define the order of the rotations. To clarify the sense of the rotations, tile small-angle approximation for the unit vector in the direction of the beam expressed in the output frame is given by:

$$u_{beam}^{out} = [\theta_y \quad -\theta_x \quad 1].$$

Gaussian Power Coupling

Assuming that longitudinal misalignments are zero and that the beam is matched to the mode field radius of the output fiber, the total coupled power $P_{out}$ (a scalar quantity measured at the output fiber) can be approximated in a Gaussian form in terms of an input power $P_{in}$ and four normalized beam alignment errors:

$$P_{out} = P_{in} e^{-\{\alpha^2 + \beta^2 - \rho^2 + \sigma^2\}}, \quad (1)$$

where $P_{in}$ is the optical power before loss due to alignment errors, and the four normalized errors $\alpha$, $\beta$, $\rho$, and $\sigma$ are given by:

$$\alpha = \frac{f}{\omega_0}\theta_x,$$

$$\beta = \frac{f}{\omega_0}\theta_y,$$

$$\rho = \frac{n_{gap}\pi\omega_0}{\lambda f}(P_x - f\theta_y) \quad \text{and}$$

$$\sigma = \frac{n_{gap}\pi\omega_0}{\lambda f}(P_y - f\theta_x),$$

where:

f is the lens focal length, $W_{92}$ is the beam radius at $1/c^2$ power density, $\lambda$ is the laser wavelength, and $n_{gap}$ is the index of refraction of the medium in the lens/fiber gap.

Constant-power Dithering

Figure 3:
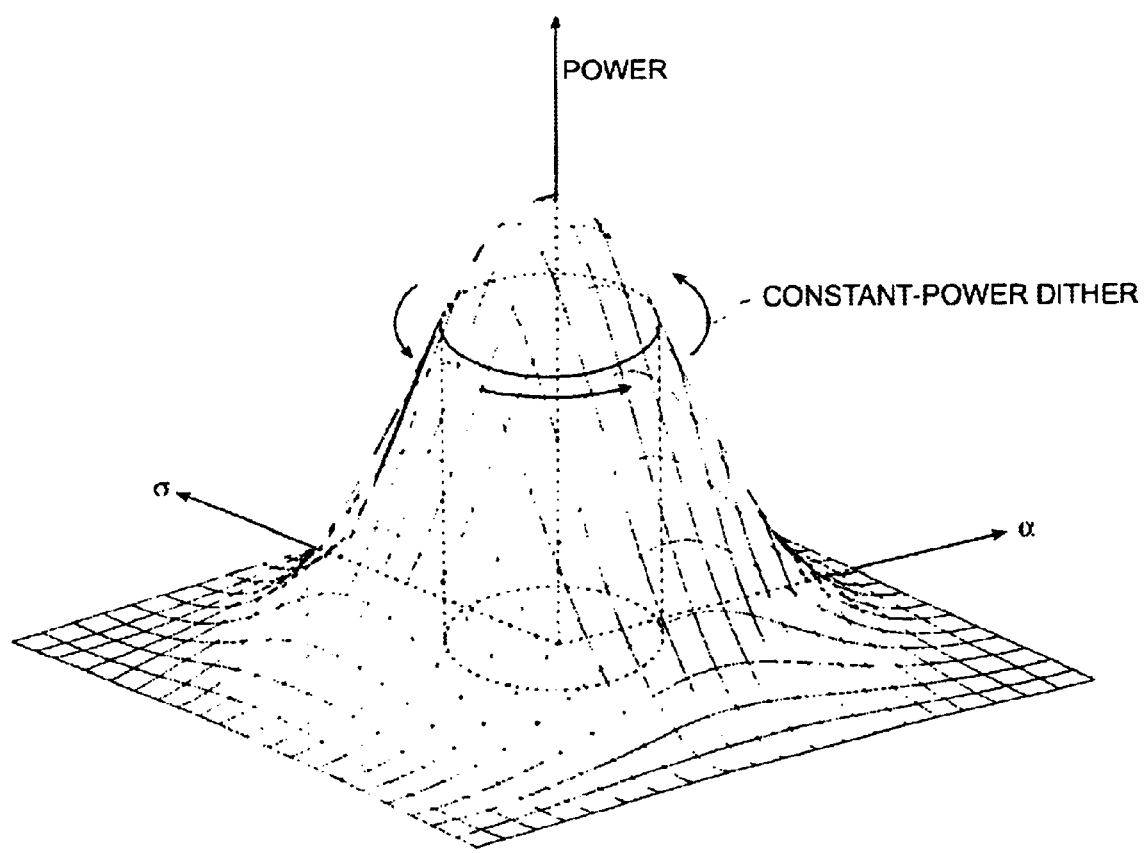
FIG. 3 is a three dimensional graph to illustrate constant-power dithering.

In the case of a MEMS fiber-optic switch for which the coupled power is Gaussian in the four normalized alignment errors, quadrature (sine and cosine signals at a given frequency) dithering of the beam alignments produces a constant coupled power when the alignment errors (ignoring the dither component) are zero and the model parameters of the system are properly tuned. FIG. 3 illustrates for two of the four axes the concept of using quadrature dithering to provide a constant output power when the coupled power is Gaussian in the two alignment errors shown. When the alignment errors (ignoring the dither component) are zero as in FIG. 3, the sine and cosine dithers at the given frequency, whether above or belong the natural resonance of the device, produce a circular trajectory in the two alignment errors. Since the sum of the squares of these two alignment errors is constant (due to the sine and cosine dithering), the result, as dictated by Equation 1, is a constant attenuated coupled power even though the individual errors are changing. If the other two dithers are also in quadrature form, these dithers will contribute a second constant loss term, such that the overall attenuation level due to the four dithers is constant.

Variable Attenuation Law

According to the invention, the variable attenuator controls the coupled power by control of beam alignment relative to a nominal optical axis. There are various techniques whereby the coupled power can be attenuated. These include applying a DC offset to the beam steering mechanism consisting of a plurality of beam steering elements, as through one or more bias command signals. In addition these techniques include application of various types of multiple time varying signals that are selected to produce a constant power output. These include applying periodic signals to the beam steering mechanism which produce beam alignment characteristics that are complementary to one another, applying harmonically related signals which produce the desired constant attenuation, applying a pair of sinusoidal signals which produce beam alignment characteristics that are in phase quadrature, or applying pairs of sinusoidal signals which are paired to produce beam alignment characteristics in phase quadrature and which signals may or may not be at different frequencies. These last two techniques will be referred to as dithering-type techniques. Combinations of DC offset and various types of time-varying signals can also be employed to effect attenuation control. As explained hereinafter as an example of the application of these principles of attenuation by controlled misalignments, coupled power is readily controlled by scaling the amplitude of excitation signals injected into the plant. It should be understood that these techniques can be used in a control system with feedback to regulate attenuation level or in an open-loop system by application of excitation signals based on some off-line criteria.

An example follows for the case of a plant incorporating a lens/fiber coupling element for which the power coupling is Gaussian in a set of normalized alignment errors. As part of a control system, a set of dither references is multiplied by a scale factor (hereinafter called the dither amplitude) to form a set of dither signals that constitute commanded values for the normalized alignment errors. The dither amplitude is adjusted by a function hereinafter called an attenuation control law. An element of the control system transforms the set of dither signals into a set of actuator excitation signals intended to produce normalized alignment errors equal to the dither signals. Assuming that the optical system is otherwise aligned either actively or passively, increasing the dither amplitude increases optical power loss according to the Gaussian coupling law given by:

$$P = P_{in} e^{A^2}.$$

where A is defined as the dither amplitude that scales a set of reference dithers that produce 1/c coupling for unity A. An example set of such dither references that distributes the loss evenly among the four normalized errors is given by:

$$[\mu_{ref} \quad \beta_{ref} \quad \rho_{ref} \quad \sigma_{ref}] = \frac{\sqrt{2}}{2}[1 \quad 1 \quad 1 \quad 1].$$

The logarithm of the power P is given by:

$$\log(P) = \log(P_{in}) - A^2.$$

For a commanded coupled power $P_{com}$, the estimated dither amplitude $A_{est}$ can be written as:

$$A_{est} = \sqrt{\log(P) - \log(P_{com})}$$

To accommodate modeling errors and possible variations in $P_{in}$, this dither amplitude $A_{est}$ should be used only as an initial estimate for the actual value of A designated $A_{com}$ that is required to produce $P_{com}$. A feedback approach to be presented next based on detecting an error term $A-A_{com}$ is robust to modeling errors and variations in $P_{in}$.

A dither-amplitude error term $A-A_{com}$, can be formed as follows. The expression for log(P) can be repeated in terms of the commanded value $P_{com}$ and the associated amplitude $A_{com}$, and in terms of the measured value $P_{meas}$ and the associated amplitude A.

$$\log(P_{com})=\log(P_{in})-A^2_{com},$$

$$\log(P_{meas})=\log(P_{in})-A^2.$$

Subtracting the expression for $\log(P_{meas})$ from $\log(P_{com})$ removes the dependence on $P_{in}$:

$$\log(P_{com})-\log(P_{meas})=A^2-A^2_{com}.$$

The difference of squares $A^2-A^2_{com}$ can be factored as:

$$A^2-A^2_{com}=(A-A_{com})(A+A_{com}).$$

Defining $A_{err}$ as the error between the present and commanded value of A:

$$A_{err}=A-A_{com},$$

the error $A_{err}$ can be expressed as:

$$A_{err}=\frac{\log(P_{com})-\log(P_{meas})}{A+A_{com}}.$$

Since the commanded value $A_{com}$ in the expression for $A_{err}$ is unknown (which was the motivation for computing the error term $A_{err}$ in the first place), an approximation for the denominator term $(A+A_{com})$ is necessary. Assuming that the initial estimate $A_{est}$ is sufficiently close to the actual value $A_{com}$, and that the value of A was initialized at $A_{est}$, the expression for $A_{err}$ can be approximated according to the invention as:

$$A_{err}\cong\frac{\log(P_{com})-\log(P_{meas})}{2A_{est}}.$$

The above approximation for the error in the dither amplitude can be used to correct the dither amplitude A. One approach for correcting the dither amplitude is to numerically integrate the instantaneous error estimate $A_{err}$ to provide a correction term $A_{corr}$ that can be subtracted from $A_{est}$ to yield A:

$$A_{corr}(0)=0$$

$$A_{corr}(j)=A_{corr}(j-1)+G\,A_{err}(j)$$

$$A(j)=A_{est}-A_{corr}(j).$$

The convergence speed of A toward the ideal value $A_{corr}$ is set by the integral gain G used to incrementally add $A_{err}$ to the existing value of $A_{com}$. An excessive gain value will yield an unstable response. Assuming the use of a reasonable gain, the value of A will converge to a value $A_{com}$ that produces the commanded coupled power $P_{com}$.

Attenuation Control System

Figure 4:
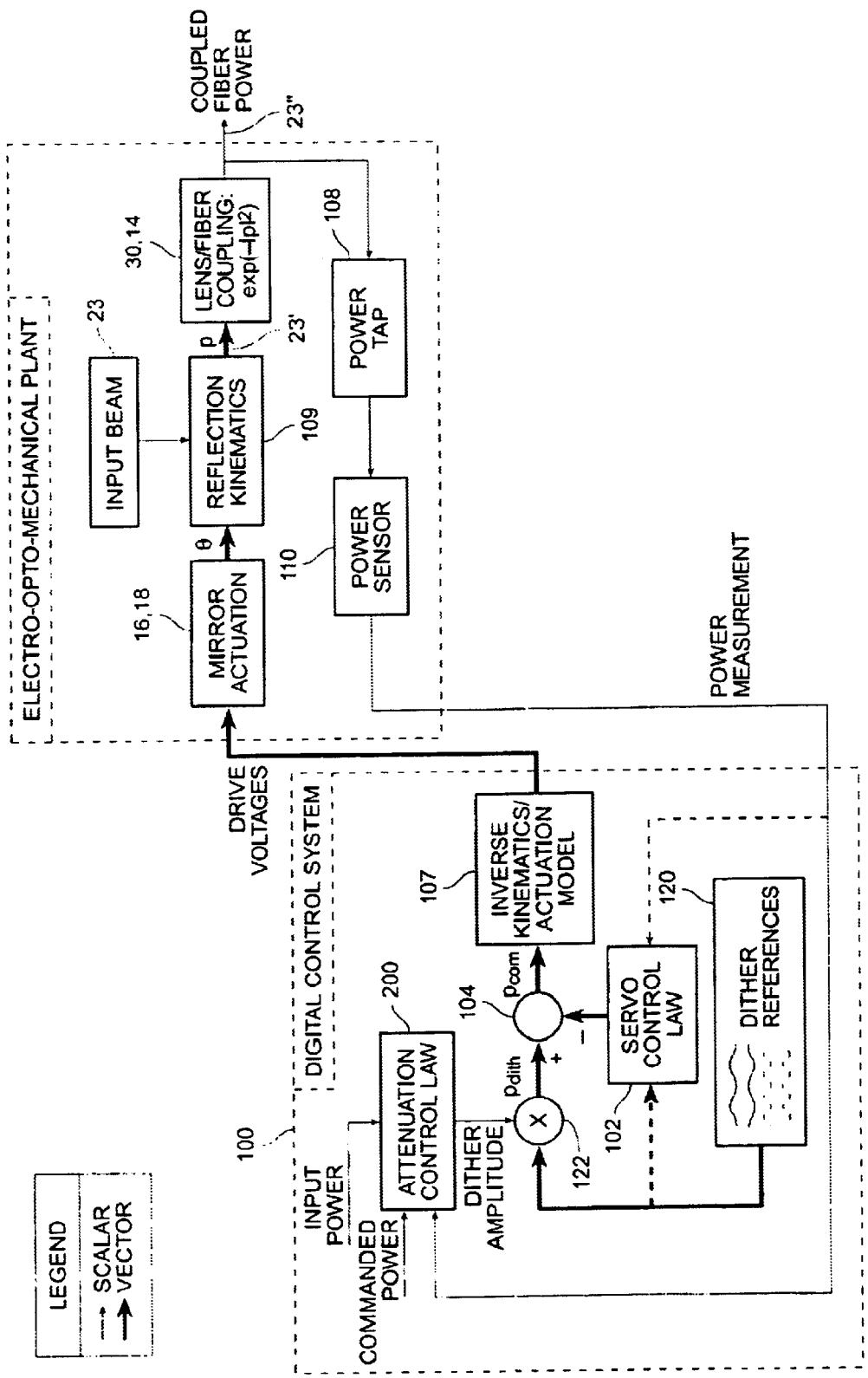
FIG. 4 is a schematic diagram of a control system employing variable optical attenuation according to the invention.

FIG. 4 is a schematic diagram of a control system 100 according to the invention illustrated in interaction with elements of a fiber optic switch of FIG. 1. The control system 100 supplies the actuation voltages for a pair of MEMS mirrors on mirror arrays 16 and 18. The MEMS mirrors produce the four mirror angles as a function of the actuation voltages. Reflection kinematics 109 specific to the optical design define the mapping of the four mirror angles to the four beam alignment errors at the output lens of lens array 30 (as shown in FIG. 2). As defined in Equation 1, the coupling of power into the output fiber of output fiber array 14 is Gaussian in the four beam alignment errors. FIG. 4 schematically illustrates the transformation shown in FIG. 1 in which beam 23 is steered by mirrors 16 and 18 to yield beam 23' incident at a lens in the output lens array 30. FIG. 4 also illustrates coupling of incident beam 23' through the lens into the associated fiber 23" of the output fiber array 14. A power tap 108 at the optical output supplies the feedback signal, which is converted to an electrical signal by a photodetector 110. Within the control system 100, the feedback power signal is supplied to the attenuation control law unit 200 and optionally 1o a servo control law unit 102 in the event there are provisions and a necessity for alignment control.

Referring again to FIG. 4, the dither references 120 are provided to the dither-multiplier junction 122 and optionally to the servo control law unit 102. The dither-multiplier junction 122 multiplies the dither references 120 by the dither amplitude generated by the attenuation control law unit 200 to produce a set of dither signals $P_{dith}$. The summer 104 combines the feedback control signals from servo element 102 and the dither signals $P_{dith}$ from multiplier unit 122 to form $P_{com}$, which is a vector of commanded values of the output-space components α, β, ρ, and σ. The inverse kinematics and actuation model 107 converts the output-space commands $P_{com}$ into actuator drive voltages, which, upon application to the plant, are intended to produce output-space errors p that track the commands $P_{com}$.

Figure 5:
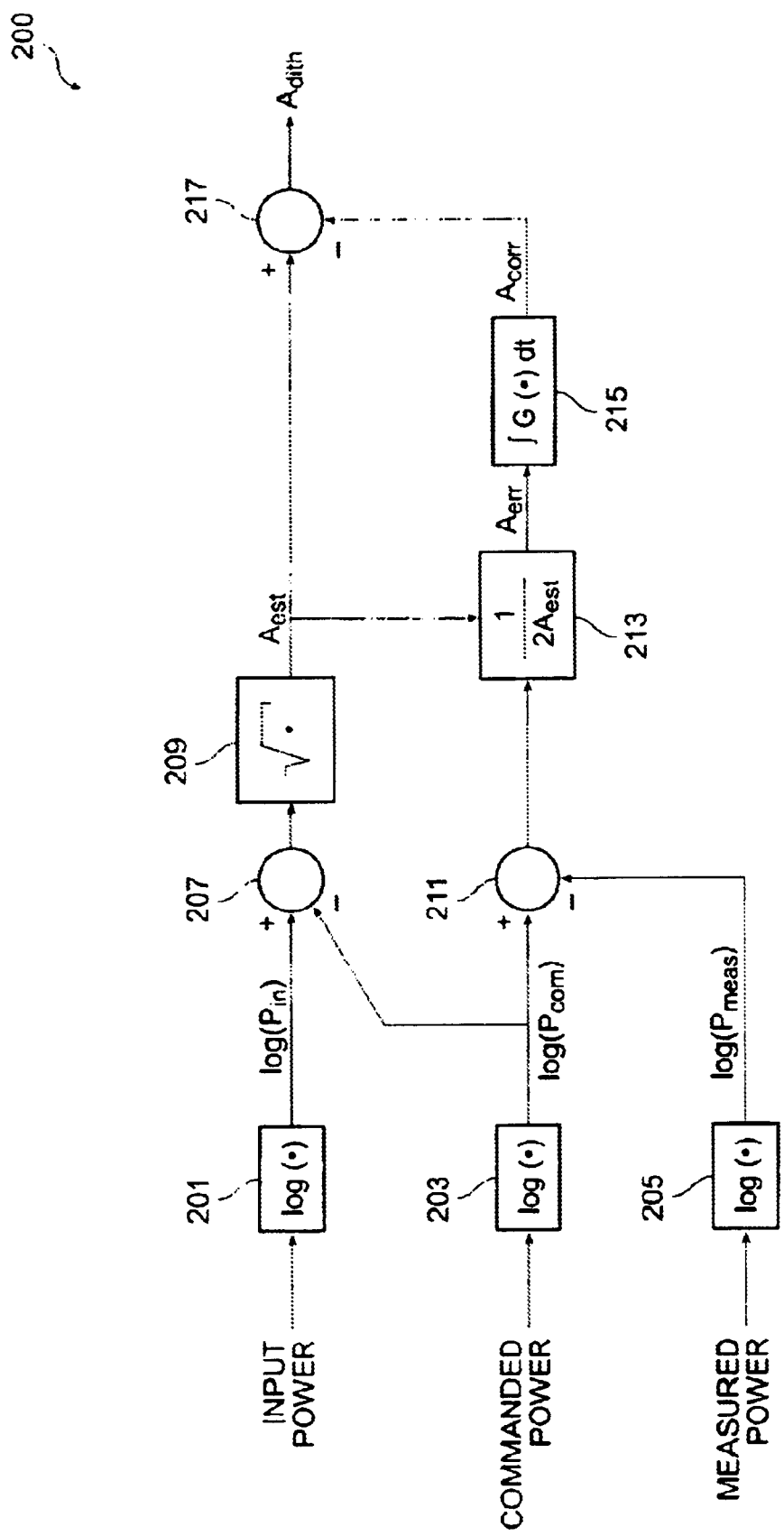
FIG. 5 is a schematic diagram to illustrate the attention control law.

FIG. 5 illustrates elements in the attenuation control law unit 200 according to the invention. Log operators 201, 203, and 205 convert the input, commanded, and measured power signals, respectively, into log space. The summer 207 forms the difference between the logarithms of the input and commanded power signals. The square-root function 209 converts the difference of logarithms into an initial estimate $A_{est}$ of the dither amplitude required to produce the commanded output power. The summer 211 forms an error signal between the logarithms of the commanded and measured power signals, which is scaled by the scaling element 213 to form the dither-amplitude error estimate $A_{err}$. The error estimate $A_{corr}$ is numerically integrated by integrator block 215 to form the correction term $A_{corr}$. Summer junction 217 forms the difference between the initial estimate $A_{est}$ and the correction term $A_{com}$ to produce the dither amplitude $A_{dith}$.

Novel Features

The novel method of Variable Optical Attenuation (VOA) as disclosed herein is incorporated into the attenuation control law unit 200 from FIG. 5 and uses the amplitude of control dithers to set the DC level of attenuation. Thus, the attenuator and dither-based servo functions can operate simultaneously or independently.

Alternate Implementations

The invention has been explained with reference to specific embodiments. Other embodiments will be evident to those of ordinary skill in the art. For example, the system need not employ dithering as for example in a system employing a DC offset for inducing beam alignment errors to produce the desired attenuation. It is therefore not intended that this invention be limited, except as indicated by the appended claims.

What is claimed is:

1. In an optical system with an output of coupled power and a plurality of beam steering elements for controlling a beam direction and location, a method for variably attenuating instantaneous power through said optical system comprising:

applying at least one time-varying excitation signal to the plurality of beam steering elements to control alignment in angle and translation between a beam a nominal optical axis to effect a constant attenuation in output of coupled power, wherein amplitude of attenuation is a function of said at least one time-varying excitation signal.

2. The method according to claim 1 wherein said at least one time-varying excitation signal comprises at least two time-varying signals which produce constant attenuation in said instantaneous power.

3. The method according to claim 1 wherein said at least one time-varying excitation signal comprises at least two periodic signals which complement one another to produce constant attenuation in said instantaneous power.

4. The method according to claim 1 wherein said at least one time-varying excitation signal comprises at least two sinusoidal signals in phase quadrature to one another which produce constant attenuation in said instantaneous power.

5. The method according to claim 1 wherein said at least one time-varying excitation signal comprises at least two sinusoidal signals harmonically related to one another which produce constant attenuation in said instantaneous power.

6. The method according to claim 1 wherein said at least one time-varying excitation signal comprises at least two pairs of sinusoidal signals, each pair being in phase quadrature, which produce constant attenuation in said instantaneous power.

7. In an optical system with an output of coupled power and a plurality of beam steering elements for controlling a beam direction and location, a method for variably attenuating instantaneous power through said optical system comprising:

applying at least one time-varying excitation signal to the plurality of beam steering elements to control alignment in angle and translation between a beam and a nominal optical axis to effect constant attenuation in output of coupled power, wherein amplitude of attenuation is a function of said at least one time-varying excitation signal further including the steps of:

monitoring said coupled power; and in response to said coupled power, adjusting said attenuation.

8. In an optical system with an output of coupled power and a plurality of beam steering elements impacting optical coupling of said coupled power, a method for variably attenuating instantaneous power through said optical system comprising:

applying a plurality of excitation signals to the plurality of beam steering elements in order to cause the beam to produce constant attenuated coupled power;

measuring said attenuated coupled power to determine a measured coupled power;

employing said measured coupled power and a commanded coupled power to determine an error in scaling of amplitude of said excitation signals; and applying a function of said error in scaling to adjust said amplitude of said excitation signals and thereby to control attenuation of said coupled power.

9. The method according to claim 8 wherein said function comprises the steps of:

introducing a set of reference signals having normalized amplitudes;

providing an initial estimate of a scaling factor for said reference signals;

determining a difference of logs of said measured coupled power and said commanded coupled power;

integrating said difference of logs at a preselected gain over time to produce a scalar correction term;

combining said initial estimate of said scaling factor with said scalar correction term to obtain a current scaling factor;

scaling said set of reference signals by said current scaling factor to obtain scaled reference signals; and applying said scaled reference signals to a kinematic transformation to obtain said excitation signals having adjusted amplitude.

10. The method according to claim 9 wherein said scaling factor is a scalar for multiplication of a plurality of dither references to produce dither signals.

11. The method according to claim 9 wherein said scaling factor a scalar for multiplication of a plurality of DC reference signals.

12. The method according to claim 8 wherein said function applying step comprises:

numerically integrating an instantaneous error estimate $A_{err}$ corresponding to said error in amplitude in said scale factor to provide a correction term $A_{corr}$ that can be added to $A_{est}$ to yield said scale factor A as follows:

$$A_{corr}(0)=0$$

$$A_{corr}(j)=A_{corr}(j-1)+G\,A_{err}(j)$$

$$A(j)=A_{est}-A_{corr}(j),$$

where G is integral gain.

13. In an optical system with output of coupled power and a plurality of beam steering elements for controlling a beam direction and location, an apparatus for variably attenuating instantaneous power through said optical system comprising:

means for computing at least one time-varying excitation signal; and means for applying said at least one time-varying excitation signal to the plurality of beam steering elements to control alignment in angle and translation between a beam and a nominal optical axis to effect constant attenuation in output of coupled power, wherein amplitude of attenuation is a function of said at least one time-varying excitation signal.

14. The apparatus according to claim 13 wherein said at least one time-varying excitation signal comprises at least two time-varying signals which produce constant attenuation in said instantaneous power.

15. The apparatus according to claim 13 wherein said at least one time-varying excitation signal comprises at least two periodic signals which complement one another to produce constant attenuation in said instantaneous power.

16. The apparatus according to claim 13 wherein said at least one time-varying excitation signal comprises at least two sinusoidal signals in phase quadrature to one another which produce constant attenuation in said instantaneous power.

17. The apparatus according to claim 13 wherein said at least one time-varying excitation signal comprises at least two sinusoidal signals harmonically related to one another which produce constant attenuation in said instantaneous power.

18. The apparatus according to claim 13 wherein said at least one time-varying excitation signal comprises at least two pairs of sinusoidal signals, each pair being in phase quadrature, which produce constant attenuation in said instantaneous power.

19. The apparatus according to claim 13 further including:
   means for monitoring said coupled power; and
   means for adjusting said attenuation in response to said coupled power.

20. The apparatus according to claim 18 further including:
   means for monitoring said coupled power; and
   means for adjusting said attenuation in response to said coupled power.

21. In an optical system with an output of coupled power and a plurality of beam steering elements impacting optical coupling of said coupled power, an apparatus for variably attenuating instantaneous power through said optical system comprising:
   means for applying a plurality of excitation signals to tho plurality of beam steering elements in order to cause the beam to produce constant attenuated coupled power;
   means for measuring said attenuated coupled power to determine a measured coupled power;
   means for employing said measured coupled power and a commanded coupled power to determine an error in scaling of amplitude of said excitation signals; and
   means for applying a function of said error in scaling to adjust said amplitude of said excitation signals and thereby to control attenuation of said coupled power.

22. The apparatus according to claim 21 wherein said function applying means comprises:
   means for introducing a set of reference signals having normalized amplitudes;
   means for providing an initial estimate of a scaling factor for said reference signals;
   means for determining a difference of logs of said measured coupled power and said commanded coupled power;
   means for integrating said difference of logs at a preselected gain over time to produce a scalar correction term;
   means for combining said initial estimate of said scaling factor with said scalar correction term to obtain a current scaling factor;
   means for scaling said set of reference signals by said current scaling factor to obtain scaled reference signals; and
   means for applying said scaled reference signals to a kinematic transformation to obtain said excitation signals having adjusted amplitude.

23. The apparatus according to claim 22 wherein said scaling factor is a scalar for multiplication of a plurality of dither references to produce dither signals.

24. The apparatus according to claim 22 wherein said scaling factor a scalar for multiplication of a plurality of DC reference signals.

25. The apparatus according to claim 21 wherein said function applying means comprises:
   means for numerically integrating an instantaneous error estimate $A_{err}$ corresponding to said error in amplitude in said scale factor to provide a correction term $A_{corr}$ that can be added to $A_{est}$ to yield said scale factor A as follows:

$$A_{corr}(0)=0$$

$$A_{corr}(j)=A_{corr}(j-1)+G\,A_{err}(j)$$

$$A(j)=A_{est}-A_{corr}(j),$$

where G is integral gain.

* * * * *